United States Patent [19]

Quermann

[11] Patent Number: 4,916,957
[45] Date of Patent: Apr. 17, 1990

[54] FLEXIBLE DISC ROTOR RATE GYRO

[75] Inventor: Thomas R. Quermann, Huntington Station, N.Y.

[73] Assignee: Unisys Corporation, Blue Bell, Pa.

[21] Appl. No.: 191,504

[22] Filed: May 9, 1988

[51] Int. Cl.⁴ .................. G01C 19/06; G01C 19/28
[52] U.S. Cl. ........................... 74/5.5; 74/5.6 D
[58] Field of Search .............. 74/5 F, 5.5, 5.6 D; 73/504

[56] References Cited

U.S. PATENT DOCUMENTS

| | | | |
|---|---|---|---|
| 2,995,938 | 8/1961 | Brodersen et al. | 74/5 F X |
| 3,323,377 | 6/1967 | Fraiser et al. | 74/5 F X |
| 3,557,629 | 1/1971 | Quermann | 74/5 F X |
| 3,559,492 | 2/1971 | Erdley | 74/5.6 D |
| 3,987,555 | 10/1976 | Haagens et al. | 74/5 F X |
| 4,061,043 | 12/1977 | Stiles | 74/5.6 D |
| 4,095,477 | 6/1978 | Morris et al. | 74/5.6 D |
| 4,217,787 | 8/1980 | Liebing et al. | 74/5.6 D |
| 4,498,340 | 2/1985 | Duncan | 74/5 F X |
| 4,587,860 | 5/1986 | Audren | 74/5 F |

Primary Examiner—Rodney H. Bonck
Attorney, Agent, or Firm—Arnold L. Albin; Albert B. Cooper

[57] ABSTRACT

A gyroscopic rate sensor has a motor driven shaft on which is mounted a flexible disc rotor enclosed in a gas-filled housing with a rotating rigid plate, also mounted on the shaft, to provide viscous gaseous restraint. A rotating capacitive plate assembly referenced to the drive motor spin axis provides a stable electrical output signal proportional to periodic deflections of the disc rotor. By perforating the disc rotor near the spin axis, spring restraint is minimized while the squeeze film damping provides improved dynamic response.

15 Claims, 4 Drawing Sheets

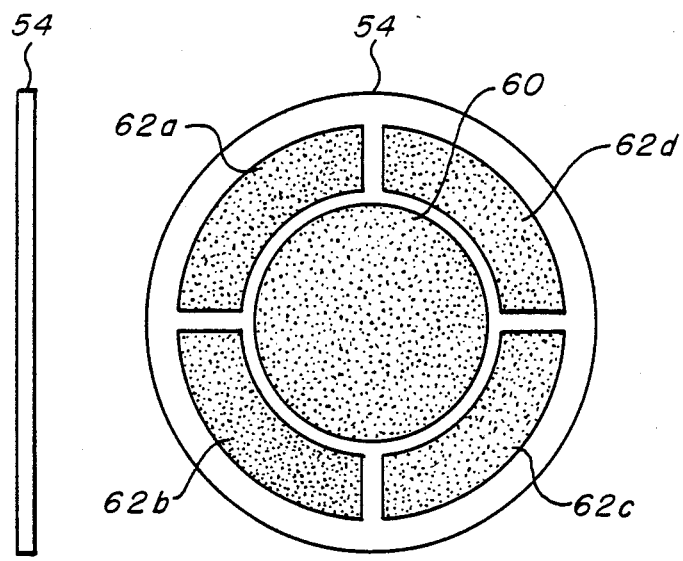
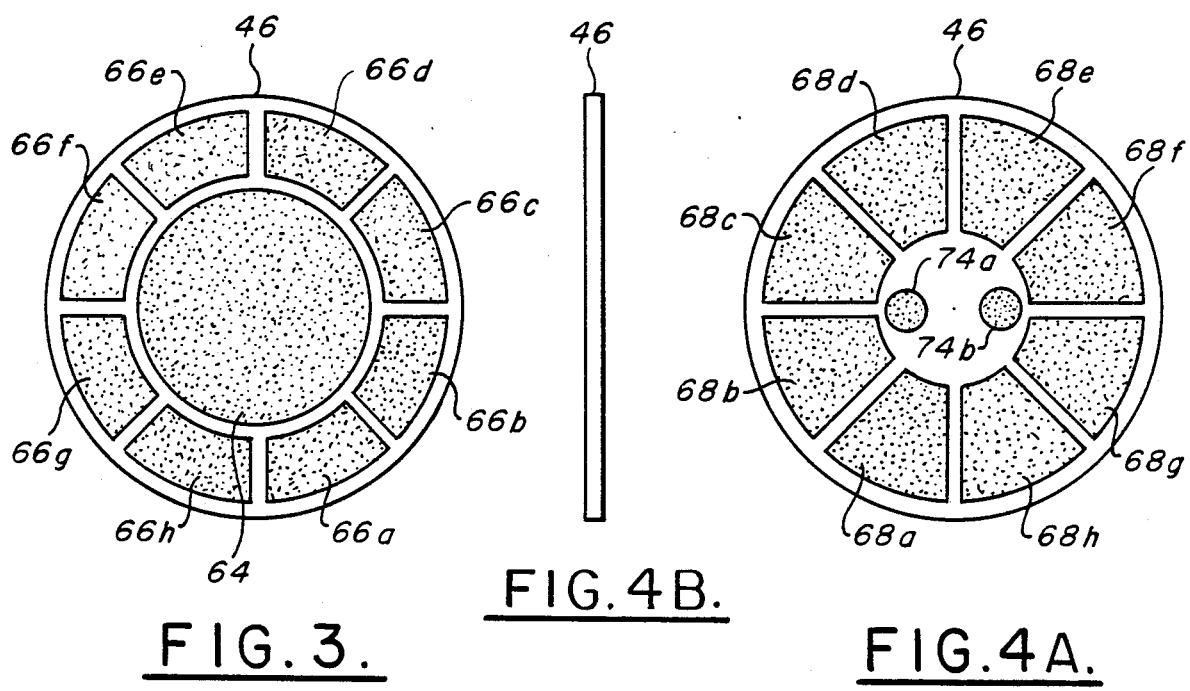
FIG.2B.   FIG.2A.
FIG.4B.
FIG.3.   FIG.4A.

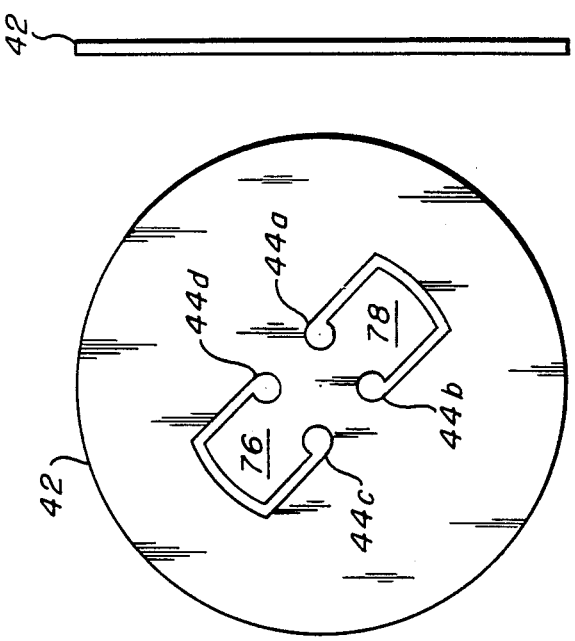
FIG.6B.
FIG.6A.
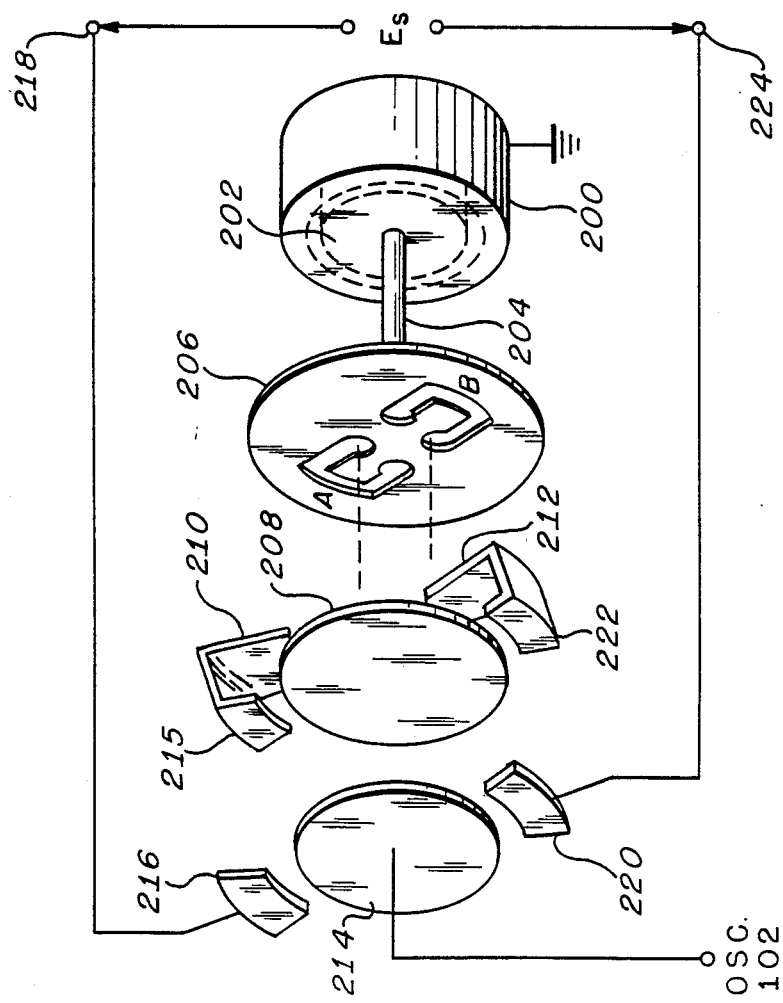
FIG.5.

FLEXIBLE DISC ROTOR RATE GYRO

BACKGROUND OF THE INVENTION

1. Field of the Invention

The invention relates to a gyroscopic instruments and more particularly to a gyroscopic rate sensor of the flexible disc rotor type.

2. Description of the Prior Art

Gyroscopic systems which use a spinning flexible disk for measuring a rate of attitude change are well known in the art. See for example, U.S. Pat. Nos. 3,323,377 and 4,498,340. As disclosed therein, a this flexible disc is mounted on the end of a shaft and spun at a high rotational velocity by a spin motor. Rotation of the gyro housing about an axis orthogonal to the spin axis results in a precessional deflection of the flexible disc rotor relative to its plane of rotation and proportional to the rate of such rotation. Electrical transducers are provided for generating electrical signals proportional to the disc rotor deflection and hence to the precession and are therefore proportional to the input angular rates.

The prior art systems have not yet resulted in a successful product capable of practical application. With a spring element as the dominant coupling between the sensing rotor and the drive shaft, the spin axis of the rotor describes a cone of diminishing amplitude about it steady state position with respect to the shaft spin axis in response to a step rate input. This results in an apparent underdamped oscillatory output on the sensing axis and a decaying oscillation in the quadrature axis, and hence exhibits a poor dynamic response.

Further, in order to provide an accurate measurement of precession rate about two perpendicular axes, each perpendicular to the spin axis, it has been necessary to provide two pairs of transducers or pick-offs, one pair for each sensing axis, with each pair being electrically connected in push-pull fashion, and the outputs differentially added to produce an output signal proportional to the direction and magnitude of the input angular rate. Since the pickoffs measure displacement of the rotor with respect to the case and precession rates cause displacement of the rotor spin axis with respect to the shaft spin axis, null instability results from any minutes shifting of the pickoff elements with respect to the shaft spin axis.

These errors are substantially reduced in the present invention by modifying the flexible disc rotor to minimize its spring restraint, adding a closely spaced rigid plate adjacent to the rotor disc on the spinning shaft, and filling the rate sensor with a gaseous atmosphere in order to provide viscous gaseous restraint. As this restraint acts in quadrature to the spring restraint, it does not adversely affect the dynamic response.

Further, null stability is enhanced by arranging the pick-off to sense spin frequency oscillation of the rotor substantially with respect to the shaft rather than rotor displacement with respect to the housing.

SUMMARY OF THE INVENTION

In accordance with the present invention, a capacitive bridge system is configured with a plurality of bridge elements mounted on an assembly spinning with the rotor disc, and excited through rotating capacitive elements. A fixed capacitive commutator couples the outputs of the bridge system for orthogonal axes to the housing. Thus, the gyroscopic rate sensor is comprised of a housing, a drive shaft supported for rotary motion within the housing, motor having a rotor having a rotor adapted for spinning about a spin axis of the drive shaft, and a flexible disc rotor coupled to the motor rotor which is spun about the spin axis. A detector, fixed in relation to the drive shaft, and substantially independent of the housing, senses a deflection of the spin axis of the flexible disc rotor with respect to the drive shaft spin axis in response to gyrodynamic reactions when the flexible disc is precessed about an axis perpendicular to the drive shaft spin axis. In the preferred embodiment, the detector comprises a rotary capacitive sensor.

The invention is further comprised by squeeze film damping of the flexible disc rotor, including a substantially rigid disc coupled for rotation with the motor rotor is spaced relationship with the flexible disc rotor and with the motor rotor, and an atmosphere confined within the housing to effectively damp undesired oscillations on the sensing axes and in quadrature thereto by providing squeeze film damping. Improved performance is obtained by minimizing the spring restraint of the flexible disc rotor by providing a perforated relief area diametrically disposed about the spin axis of the flexible disc rotor, thereby allowing relatively free deflection of the rotor.

BRIEF DESCRIPTION OF THE DRAWINGS

A preferred embodiment of the invention is illustrated in the accompanying drawings wherein:

FIGS. 2A, 3 and 4A are plan views of the various capacitive elements comprising the novel sensor configuration of the rate hyroscope according to the invention. FIGS. 2B and 4B are end views of the diskoidal supports for the capacitive elements of the invention.

FIG. 5 is a partial perspective exploded view of the rotor, drive motor and capacitive pick-up elements of the rate gyroscope.

FIG. 6A is a plan view showing the novel modification of the disc rotor for rotor for minimizing spring restraint coefficient. FIG. 6B is an end view of the flexible disk rotor element.

DESCRIPTION OF THE PREFERRED EMBODIMENT

Figure 1:
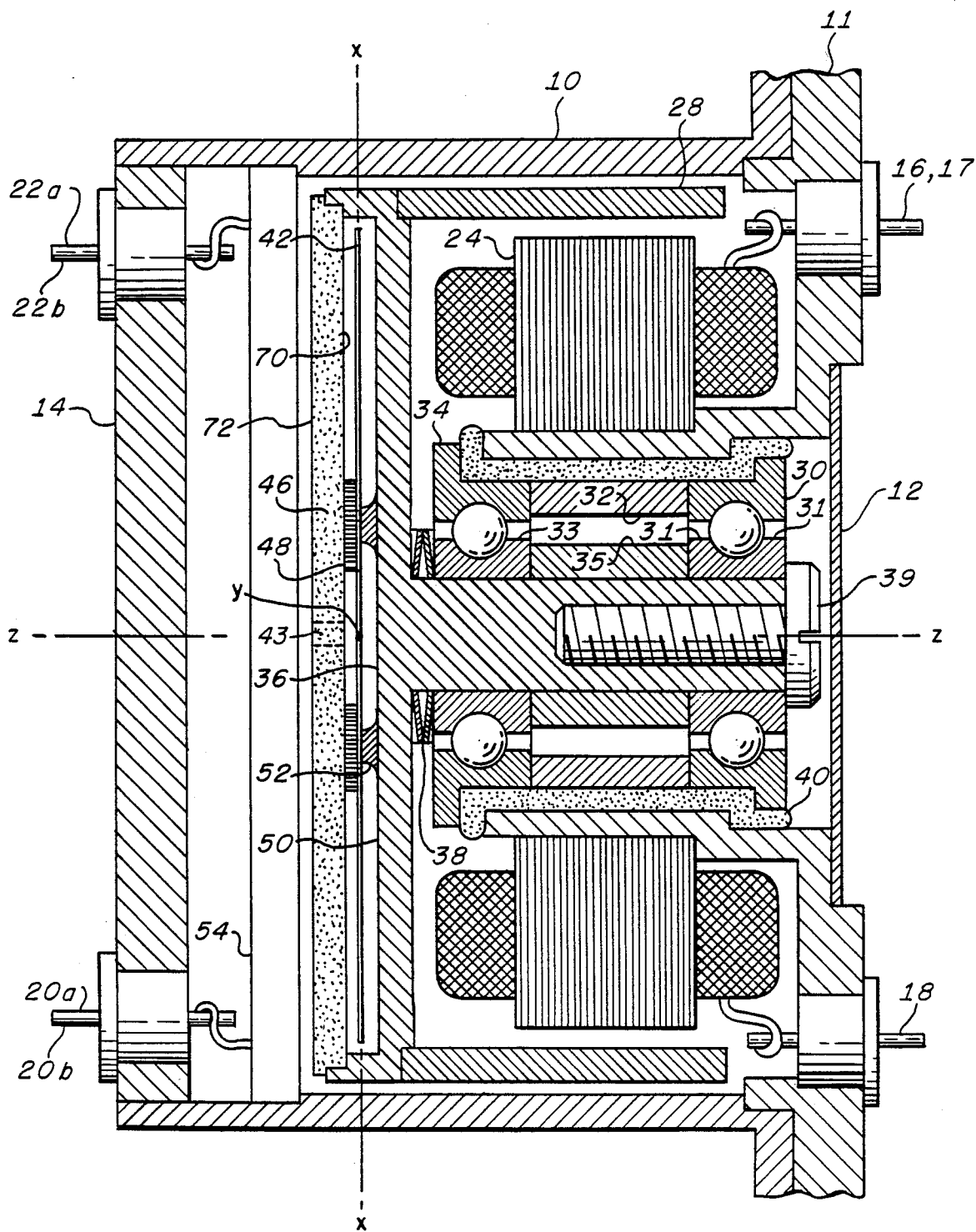
FIG. 1 is cross-sectional view of the flexible disc rate gyro of the present invention.

Referring now to FIG. 1, the flexible disc rotor gyroscopic sensor comprises a gyroscope housing 10 sealed to base 11 which is adapted for rigidly mounting to a vehicle, and having a spin axis Z—Z, the rates of rotation about axes x, y of which are to be measured. Covers 12 and 14 are hermetically sealed respectively to the base and housing, which is evacuated and then backfilled with a fluid to provide an atmosphere having a suitable viscosity, such as helium. Electrical terminals 16, 17, 18, are hermetically sealed to the mounting base 11, adapted for rigidly mounting the housing to a vehicle, to conduct operating voltages into and out of the housing, which may be derived from a two-phase power source. A stator 24 of an electric spin motor is fixedly secured to the base 11, the motor rotor 28 being mounted in suitable spin bearings 30 and 34 with bearing spacer 32 for spinning about the rotor spin axis Z—Z. The motor rotor 28 includes an axial shaft 36, adjustable spacers 38, which may be Belleville type washers, internal bearing races 31 and 33 and a fixed bearing spacer 35. One end of rotor shaft 36 extends axially and is internally threaded to receive a rotor clamping screw 39. Adjustment of the screw 39 determines the compression of the Belleville washers 38 and adjusts the axial position of the shaft 36.

Terminals 16, 17 and 18 couple electrical connections to the motor stator 24 through feedthrough bushings. Preferably, the motor is of the synchronous type, although an induction motor is also suitable. Electrical terminals 20a and 20b are provided for introducing d.c. power from an external source (not shown) to the sensor system. The quadrature signal outputs appear at terminals 22a and 22b, respectively, and are referenced to the grounded gyro case. The bearings 30 and 34 are preferably insulated from the base 11 by a layer of insulating material 40 which may be comprised of non-conductive epoxy. In practice, at the high rotational speeds of the bearings, hydrodynamic lubrication with a non-conductive lubricant may provide sufficient insulation resistance, thereby obviating the need for insulator 40. The flexible disc rotor 42 of the gyro comprises a thin disc of flexible metal, such as beryllium copper. In the preferred embodiment, as shown by FIG. 6B, which is an end view of the flexible disk rotor element, the rotor disc 42 is 0.635 inches in diameter and 0.0030 inches thick; conventional machining and hardening techniques may be used to produce uniformity of thickness and freedom of internal material stresses to assure acceptable balance and flatness thereby. As shown more clearly in FIG. 6A, the rotor disc 42 is machined with a plurality of strain relief holes 44a–44d and is cemented to an insulating member 46 which serves as a support for the flexible disc and is affixed for rotation with rotor 28. Spacers 48 provide a predetermined spacing between rotor disc 42 and insulating member 46, which is a function of the desired sensing range of the gyroscope. In the preferred embodiment, a damping gap of 0.003 inches is provided by the spacers 48, and the disc rotor 42 is further spaced by a gap of 0.010 inches from the planar face 50 of the motor rotor 28. The flexible disc rotor 42 is further electrically connected to the planar surface 50 of the axial shaft 36 by a conductive epoxy cement 52.

Angular deflection of the rotor spin axis with respect to the drive shaft spin axis, resulting from a rate of rotation of the housing, is detected by a capacitive sensor, substantially mechanically independent of the housing, which provides outputs in quadrature in response to gyrodynamic reactions when the flexible rotor disc is precessed about an axis perpendicular to the spin axis Z—Z. Thus, the rate about any axis perpendicular to the spin axis may be determined from a summation of the quadrature outputs. FIGS. 2A, 3 and 4A show details of the capacitive elements comprising the sensor. FIGS. 2B and 4B are end views of the diskoidal supports for the capacitive elements of the invention. With continued reference to FIG. 1, a stationary dielectric support 54, which may be comprised of alumina, is secured to the housing 10 for supporting first diskoidal capacitive element 60, shown in FIG. 2A. A plurality of arcuate elements 62a, 62b, 62c, 62d are circumferentially disposed about the diskoidal capacitive element 60 and also mounted to the surface of dielectric support 54 proximate to a rotary dielectric support 46. FIG. 4B is an end view of the diskoidal dielectric support 46. Elements 62a, 62b, 62c and 62d serve as commutating elements for receiving signals from a rotating assembly to be described, without the use of brushes or slip rings. Preferably, the capacitive elements may be formed by plating or screening on the dielectric support element 54 to a nominal thickness of 0.0003 inches. In the preferred embodiment, the diskoidal element 60 has a diameter of 0.390 inches. The arcuate elements 62a–62d have an external diameter of 0.632 inches and an internal diameter of 0.430 inches, thus providing a gap of 0.020 inches with respect to diskoidal element 60. The arcuate elements 62a–62d are further configured to provide four segments, each spanning a 90° sector with a radial gap of 0.020 inches between each segment. Attached to the distal surface of dielectric support 54 is an electronic assembly (not shown) which may be comprised of an integrated circuit, whose details will be discussed with respect to FIG. 7.

The rotary dielectric support member 46 has a first planar surface 70 and an opposing planar surface 72 which are respectively spaced a predetermined distance with respect to the diskoidal rotor 42 and the capacitive elements on support 54.

FIG. 3 shows the configuration of the capacitive elements affixed to surface 72 of rotary dielectric support 46. A second diskoidal capacitive element 64 is disposed on the planar surface 72 of dielectric support 46 in a manner similar to capacitive element 60. Surrounding capacitive element 64 is a further plurality of arcuate segmented capacitive elements 66a, 66b, 66c, 66d, 66e, 66f, 66g, and 66h. Capacitive element 64 preferably has a diameter of 0.400 inches while the supporting insulator 46 has a diameter of 0.672 inches. Arcuate elements 66a–66h are comprised of eight such segments, each segment encompassing substantially 45° and having an outer diameter of 0.632 inches and an inner diameter of 0.420 inches, thereby providing a gap between the diskoidal capacitive element 64 and the segmented elements 66a–66h of 0.010 inches.

Referring now to FIG. 4A, the rotary dielectric support 46 is provided on its proximal surface 70 with a further plurality of arcuate elements 68a, 68b, 68c, 68d, 68e, 68f, 68g, and 68h. Eight such segmented elements are provided, each spanning substantially 45°. Each segment has an outer diameter of 0.632 inches and an inner diameter of 0.245 inches. Each segment is configured to provide a gap of 0.010 inches therebetween. Further, each segment 68a–68h is connected to corresponding segments 66a–66h by plated through holes or other conventional means. Also shown in FIG. 4A are conductive pads 74a and 74b for mounting to pads 76 and 78 of rotor 42 with spacers 48. Preferably, the front-to-back registration of the capacitive elements of FIG. 3 and FIG. 4A should be within 1.0°. Capacitive elements 68a–68h may be of the order of 0.00030 inches in thickness, while support 46 is preferably 0.025 inches thick.

A further capacitive coupling element is provided by the stator 24 and rotor 28 of the spin motor and housing 10 since the structures are electrically isolated by insulator 40. Referring again to FIG. 6, the flexible disc rotor 42 is seen to be perforated by a pair of U-shaped strain relief apertures defining mounting pads 76 and 78. For a rotor disc 0.635 inches in diameter and 0.003 inches thick, the perforations extend radially over a diameter of 0.218 inch and an aperture of 0.010 inch. The perforations laterally extend 0.072 inches. Further, four 0.039 diameter through holes 44 are provided to form two pairs of twisting flexure areas. The through holes are radially displaced 0.0417 inches from the spin axis.

The design shown of the preferred embodiment will yield a very high rate sensing unit. A thinner disc with smaller active flexible areas together with a larger damping gap would be required for a low sensing rate unit. Thus, the specific proportions of rotor thickness, damping gap and rotor cutouts will depend upon the desired nominal range of the gyro. It is also possible to reduce the gyro sensing range and obtain more sensitivity by selectively reducing the thickness of the disc rotor symmetrically in the flexure band regions between the holes 44a–44d of the flexible disc rotor.

In accordance with the present invention, viscous gaseous damping has been added to the gyro to provide the primary restraint for the flexible disk rotor. The damping is provided by squeeze film action between rigid planar surface 70 of support 46 and flexible disk rotor 42. Housing 10 is filled with a suitable gas or fluid thereby to provide viscous restraint to the flexible disc rotor. A port 43 in dielectric support 46 permits flow of the gas between the housing and rotor. The sensing range of the gyro is determined by the inertia (thickness and density) of the flexible disc rotor, and the damping (gaps and viscosity of gas). Since gases have a wide range of viscosities, from 88 micropoise for hydrogen to 314 micropoise for neon, for example, trimming a gyroscopic sensor for a particular specification can be readily accomplished at final calibration by selecting the proper gas fill. The gases generally used have a relatively flat viscosity versus temperature characteristic of approximately 0.2%/degree C. Thus, stable output over a wide temperature range may easily be attained with modest compensation in the readout electronics.

Figure 7:
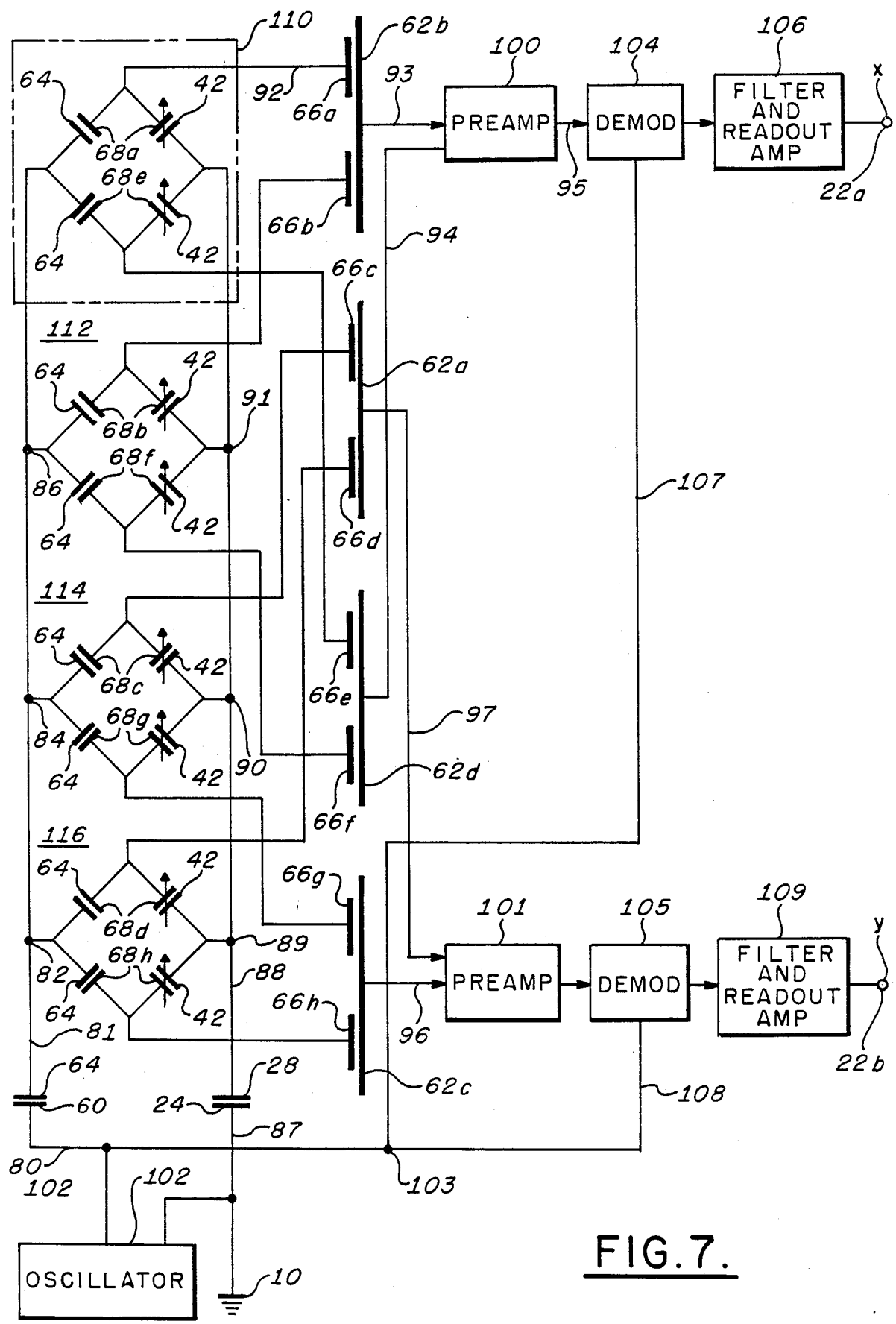
FIG. 7 is a circuit diagram of the signal processor circuit for the rate gyroscope according to the invention.

Since the electrical outputs of the rotating capacitive assembly are of high impedance, preamplifiers 100 and 101, as shown in FIG. 7, are preferably located on support plate 54. The capacitive elements are configured in a differential bridge system with all bridge elements mounted on the spinning assembly and excited through rotating capacitive elements. The outputs for the xy axes are commutated to case coordinates by the fixed capacitive plates on the housing. The preamplifiers located in the gyro case in close proximity to the commutator plates minimize the difficulties that might be expected from the high impedance capacitive pick-off elements. FIG. 7 shows a schematic block diagram of the capacitive sensing elements configured in a bridge arrangement and the associated amplifier circuitry. As the circuit is symmetrically disposed, bridge circuit 110 is representative of the four bridge configurations. Pairs of the bridge outputs are differentially coupled to preamplifiers as is set forth below. An oscillator 102 provides excitation to the bridge elements. Housing 10 may be considered the electrical ground of the system. The oscillator 102 is preferably of the sinusoidal type and operates at a relatively high frequency with respect to the rotor spin frequency. Due to the very small capacitances of the bridge pick-off elements, a very high frequency, of the order of 1 MHz, is desirable, consistent with the limitations imposed by the demodulating electronics. Oscillator 102 is preferably packaged within the gyroscope case to reduce the number of wires connected to the gyro and minimize the radiation of this high frequency signal to other components in an associated system.

The capacitive elements of FIG. 7 correspond to the capacitive elements of FIGS. 2A, 3 and 4A. Thus, referring to block 110, a variable capacitor is formed by the flexible disc rotor 42 and the arcuate segment 68a. Since the distance of the flexible disc rotor will vary in accordance with the precession rate of the gyro, the two elements comprise a variable capacitor, denoted by an arrow through parallel plates. Similarly, a further variable capacitor is formed by flexible disc rotor 42 and arcuate element 68e which, as shown in FIG. 4A, is diametrically opposed to capacitive element 68a. The diskoidal capacitive element 64 of FIG. 3A is coupled in common to arcuate elements 68a and 68e and since the spacing is a predetermined distance, represents a constant capacitance. Note that, in general, the capacitance will be determined by the overlapping area of the capacitive elements, the spacing, and the dielectric constant of the supporting dielectric or gaseous medium. Diskoidal capacitive element 60 and diskoidal capacitive element 64 form a further fixed capacitor which is coupled via a lead 80 to oscillator 102. The signal from capacitive element 64 is further coupled via overlapping with the arcuate elements 68a–68h to bridge circuits 112, 114, and 116, shown for clarity by lead 81 and nodes 82, 84, and 86. A ground return path to terminal 20b for bridge circuits 110–116 is provided by the rotating capacitor formed by the spin motor and its rotor 28 and stator 24 through leads 87, 88, and nodes 89, 90, and 91. Thus, each of the four bridge circuits is effectively energized in parallel and mechanically isolated from the housing 10.

The output from capacitive element 68a is coupled over lead 92 to segment 66a. Similarly, the output from segment 68b of bridge 112 is coupled to segment 66b. Since element 62b spans a 90° radius, it effectively sums the outputs of capacitive elements 66a and 66b. Of course, the example shown is for an instantaneous position of the flexible disc rotor assembly and the relative positions of the segmented capacitive elements on the rotating assembly will change with respect to the segmented elements of the fixed capacitive plates in accordance with the spin rate of the rotor assembly. In a like manner, the output of capacitive segment 68e of bridge 110 and capacitive segment 68f of bridge 112 are applied to capacitive elements 66e and 66f respectively, where they are coupled to capacitive element 62d. The developed signal at capacitive segment 62b is applied on lead 93 to one input of differential preamplifier 100. The signal developed at segment 62d is coupled on lead 94 to the oppositely polarized input of preamplifier 100. Thus, the output 95 of preamplifier 100 is a difference of the signals developed across two diametrically opposing segments of the fixed capacitive plate assembly which has been applied to insulating support member 54. In a similar manner, bridge circuits 110, 112, 114 and 116 are coupled to provide outputs to capacitive elements 66c, 66d, 66g, and 66h, which signals are coupled to the respective fixed segments 62a and 62c and applied on leads 96 and 97 to a further differential preamplifier 101. The outputs of preamplifiers 100 and 101 are applied in a conventional manner to synchronous demodulators 104 and 105, respectively. The demodulators are also responsive to a synchronizing signal from oscillator 102 applied to node 103 and leads 107 and 108. Amplifiers 106 and 109 serve to filter and amplify the respective demodulator outputs and provide a direct current output proportional to the precessional rate of the gyroscopic sensor. The circuit components denoted by blocks 100, 101, 102, 104, 105, 106 and 109 are conventional and may be comprised of integrated circuits or, preferably, from a thick film microcircuit deposited upon insulating support 54.

Operation of the flexible disc rotor gyroscopic apparatus may be understood by referring to the exploded view of FIG. 5. A drive motor 200 is provided with a stator connected to a ground and a rotor 202. Rotor 202 is connected to a shaft 204 which drives the flexible disc rotor 206. Motor shaft 204 is in axial alignment with the housing (not shown). Rotor 202 is brought up to speed, say 24,000 rpm. Rotor 206 is mechanically coupled to an insulated disk (not shown) which supports capacitive plate 208, and which is driven in accordance therewith. Since the gyroscopic rate sensor housing is attached to the body or frame of the system to be monitored or stabilized, when the vehicle is rotated about an axis orthogonal to the drive shaft spin axis, the rotor 206, being elastic, will bend along the x and y axes. The amount of rotor deflection is a function of the angular velocity or rate of the housing rotation, that is, it is proportional to the magnitude of the component of the rate vector in the plane of the disc 206. Capacitive segments 210 and 212 are diametrically disposed and capacitively coupled to rotor disc 206. An oscillator 102 furnishes excitation between a further capacitive disc 214 and the grounded housing of spin motor 200. This signal is capacitively coupled to capacitive element 208 and in turn to the disc rotor 206.

As a result of the deflection of disc rotor 206, a point A, for example, may be deflected towards segment 210, while a point B diametrically opposed to point A may be correspondingly deflected away from segment 212. Since the rotor disc 206 and the segments 210 and 212 are closely coupled, signals corresponding to the respective displacement of rotor disc 206 will be coupled to the capacitive segments. Accordingly, a differential voltage signal will be developed across segments 210 and 212 proportional to the deflection of disc rotor 206 which in turn is a function of the precession rate of gyro. Segmented capacitive element 215 is directly coupled to segmented capacitive element 210 and therefore provides a signal in accordance therewith. This signal is coupled into a further segmented element 216 which is affixed to the housing and to a terminal 218. Similarly, segmented element 220 receives a signal coupled from capacitive element 222 as a result of the spatial displacement of disc rotor 206 and segmented element 212. This signal is coupled to terminal 224. Thus, there is developed across terminals 218 and 224 a voltage with a carrier frequency corresponding to the oscillator frequency. The recovered signal amplitude is proportional to the angular displacement of the rotor spin axis with respect to the drive shaft spin axis. While only one set of capacitive segments is shown, for clarity, a second set of orthogonal segments is provided for signal pick-up. Therefore, rates about two axes can be measured simultaneously. The output signal $E_S$ from each set of pick-ups can be applied to a preamplifier demodulator, and filter, as shown in FIG. 7.

In operation, the torque required to precess the disc rotor to follow any input rates applied to the case perpendicular to the spin axis is supplied primarily by the squeeze film damping reaction between the flexible disc rotor and the rigid capacitive plate assembly. This torque is proportional to the amplitude of oscillation of the flexible disc with respect to the rotating plate assembly at the spin frequency. The commutation of the bridge circuit outputs is essentially a demodulation at spin frequency which gives a signal proportional to changes in the angular rotor displacement with respect to the shaft. The two pairs of case-fixed plates provide demodulation at two different phase angles, thus separating the signal outputs into components proportional to the applied rate about each of two orthogonal axes.

The present invention provides an output which is substantially independent of null instability with respect to the housing. Pick-off action establishes a potential difference across the diameter of spinning disk 46 which is predetermined with respect to case-fixed coordinates. The location of the diameter with the maximum potential difference and the magnitude of the potential depend primarily upon the magnitude and location of the input rate. Referring to FIG. 5, to the extent that variations in the capacitance between elements 214 and 208 and between elements 202 and 200 modulate, the voltage between 208 and 206 as the shaft rotates, there will be a cyclic change in the magnitude of the potential difference. In the presence of a tilt of the spin axis of the rotor with respect to the shaft that does not change with rotation (e.g., null instability), this gain change will cause an output. However, the magnitude of the output will be much less than the output that would be caused by a similar tilt of a case referenced wheel with respect to the case. For example, a 1' tilt with a ±5% gain modulation would generate a 0.025' null offset in this gyro, whereas the case reference gyro would see a 1' null shift for a 1' shift in its pick-off elements.

Spin modulation of the capacitance between elements 216 and 215 and between elements 220 and 222 has no effect on the output so long as the input impedance of the preamplifier (lead across 218, 224) is substantially infinite. This is not difficult to achieve with conventional integrated circuits. A low impedance will load the bridges and cause an apparent gain change with modulation. The effect of such a gain change was noted above. Thus, these effects are second order and exist only to the extent that practical limitations prevent the achievement of infinite impedances and infinite capacitances.

A novel feature of the invention lies in the use of a flexible disc rotor with integrally machine flexure support restrained by gaseous squeeze film damping between the rotor disc and an adjacent rigid plate mounted on the same shaft. A plurality of capacitive bridge circuits is used for signal injection and pick-off, where the rigid plate comprises fixed capacitive plates with the disc rotor forming the moving plate of the variable capacitors of the bridge circuits. The capacitive bridges are excited through rotating capacitive plates adjacent to the fixed capacitive plates. The output signals are transferred from the rotating structure to the case by means of commutatorlike capacitive elements on a rotating structure adjacent to fixed capacitor plates on the case. The commutator plates then are connected to appropriate points on the bridge circuit. By forming one of the fixed capacitive plates on an insulating substrate, it is also suitable for mounting signal preamplifiers.

While the invention has been described in its preferred embodiments, it will be understood that the words which have been used are words of description rather than of limitation and that changes within the purview of the appended claims may be made without departure form the true scope and spirit of the invention in its broader aspects.

I claim:

1. A gyroscopic rate sensor comprising:

housing means, drive shaft means supported for rotary motion within said housing means, motor rotor means adapted for spinning about a spin axis of said drive shaft means, flexible disc rotor means coupled to said motor rotor means and including a rotor body and integrally formed articulating support means for providing a predetermined spring restrain coefficient and a rotor spin axis substantially independent of said spin axis of said drive means, so that said disc rotor means responds to precessional forces as a rigid rotor articulated at said drive shaft means, squeeze film damping means for damping said flexible disc rotor means, comprising a substantially rigid disc coupled for rotation with said motor rotor means in spaced relationship therewith and in spaced relationship with said flexible disc rotor means and having a diameter greater than said flexible disc rotor and a thickness substantially greater than said flexible disc rotor, fluid means surrounding said flexible disc rotor means and confined within said housing means, so that undesired oscillations of said rotor means are effectively damped while allowing substantially free deflection of said spin axis of said flexible disc rotor means, and detection means fixed in relation to said drive shaft means and substantially mechanically independent of said housing means for sensing the angular deflection of said rotor spin axis with respect to said spin axis of said drive shaft means in response to gyrodynamic reaction when said flexible disc rotor means is precessed about an axis perpendicular to said spin axis of said drive shaft means.

2. A gyroscopic rate sensor as set forth in claim 1, said means for sensing deflection comprising rotary capacitance means responsive to oscillations of said disc rotor means with respect to a plane perpendicular to said spin axis.

3. A gyroscopic rate sensor as set forth in claim 2, said rotary capacitance means further comprising:

rotary dielectric support means having first and second planar opposing surfaces and coupled to said motor rotor means for rotary motion about said spin axis of said drive shaft means, said first surface disposed in spaced relationship proximate to said flexible disc rotor means, first diskoidal capacitive element means disposed on said second planar surface of said rotary dielectric support means, first segmented capacitive element means comprised of a plurality of arcuate elements circumferentially disposed about said first diskoidal capacitive element means, and second segmented capacitive element means comprised of a plurality of arcuate elements circumferentially disposed on said first planar surface of said rotary dielectric support means, ones of said elements thereof corresponding to ones of said first segmented capacitor element means and conductively coupled thereto, said second segmented element means further capacitively coupled to said flexible disc rotor means for sensing deflections thereof, said deflections causing a variation in effective capacitance in proportion thereto.

4. A gyroscopic rate sensor, as set forth in claim 3, further comprising motor means for applying said rotary motion to said drive shaft means, said motor means including stator means defining a capacitive element coupled to said housing and rotor means defining a further capacitive element coupled to said stator means, said coupled capacitive elements forming a motor means capacitance of substantially constant capacitance with respect to rotation of said rotor means.

5. A gyroscopic rate sensor as set forth in claim 4, further comprising:

stationary dielectric support means coupled to said housing for supporting second diskoidal capacitive element means distal to said rotary dielectric support means, said stationary dielectric support means in spaced relationship to said rotary dielectric support means, third segmented capacitive element means comprised of a plurality of arcuate elements circumferentially disposed about said second diskoidal capacitive element means, ones of said third segmented capacitive element means capacitively coupled to a plurality of elements of said first segmented capacitive element means, and means for coupling said first and second diskoidal capacitive element means, said first and third segmented capacitive element means, and said motor means capacitance to form an electrical bridge circuit responsive to a source of regular excitation and providing outputs for measuring the deflections of the spin axis of said disc rotor means along radial axes in quadrature and perpendicular to said spin axis of said drive shaft means, said outputs reference along predetermined coordinates with respect to said housing means.

6. A gyroscopic rate sensor as set forth in claim 5, wherein said motor means comprises an induction motor.

7. A gyroscopic rate sensor as set forth in claim 6, wherein said motor means comprises a synchronous motor.

8. A gyroscopic rate sensor as set forth in claim 7, wherein said source of regular excitation comprises a sinusoidal oscillator.

9. A gyroscopic rate sensor as set forth in claim 5, further comprising:

pairs of diametrically disposed elements of said third segmented element means disposed in quadrature for sensing rotor deflections corresponding to a precession rate about two perpendicular axes, each said axis perpendicular to said spin axis of said housing means.

10. A gyroscopic rate sensor as set forth in claim 9, further comprising preamplifier means coupled to said diametrically opposing pairs of said first segmented capacitive element means for providing an output signal representative of periodic deflection of said flexible disc rotor means.

11. A gyroscopic rate sensor as set forth in claim 10, further comprising demodulator means coupled to receive said output signal in alternating current form and for deriving a direct current output signal corresponding thereto.

12. The gyroscopic rate sensor as set forth in claim 11, wherein said direct current output signal is representative of the direction and angular rate of motion of said gyroscopic rate sensor.

13. A gyroscopic rate sensor as set forth in claim 1, further comprising:

means perforating said flexible disc rotor means, diametrically opposed and extending from substantially said drive shaft means spin axis along a predetermined radial extent for providing a predetermined spring restraint coefficient of said disc rotor means, so that said disk rotor means responds to precessional forces as a rigid rotor articulated at said drive shaft means.

14. A gyroscopic rate sensor as set forth in claim 13, said flexible disc rotor means further comprising:
a perforated relief area defining first and second radial members forming said articulating support means for torsionally suspending said disc rotor means about said spin axis of said drive motor means,
said first and second members having a predetermined thickness selectively reduced with respect to a planar thickness of said rotor body so as to provide a predetermined spring restraint.

15. A method for sensing precession rate in a gyroscopic rate sensor having a housing enclosing flexible rotor disc of unitary construction, a drive motor for spinning the rotor disc along a shaft spin axis, and a detector for sensing deflections of the spin axis of the rotor disc in accordance with a precession rate of the sensor, wherein the improvement comprises:
capacitively detecting deflections of said rotor disc spin axis with respect to said shaft spin axis along predetermined coordinate axes with respect to said housing,
capacitively isolating said detector to provide mechanical independence from said housing,
providing an integrally formed strain relief axially disposed within said rotor disc to minimize the spring restraint coefficient, and
providing a rigid disc in spaced relationship with said rotor disc for damping said rotor disc when surrounded by a gaseous atmosphere, thereby to restrain angular and axial motion of said rotor disc.

* * * * *